May 24, 1960 C. L. ROUAULT 2,938,081

SELECTIVE TRANSMISSION SYSTEM FOR TELEPHONIC RINGING

Filed Dec. 27, 1952

Inventor:
Charles L. Rouault,
by Charles M. Hutchins
His Attorney.

2,938,081

SELECTIVE TRANSMISSION SYSTEM FOR TELEPHONIC RINGING

Charles L. Rouault, Syracuse, N.Y., assignor to General Electric Company, a corporation of New York Filed Dec. 27, 1952, Ser. No. 328,159

8 Claims. (Cl. 179—84)

Figure 1:
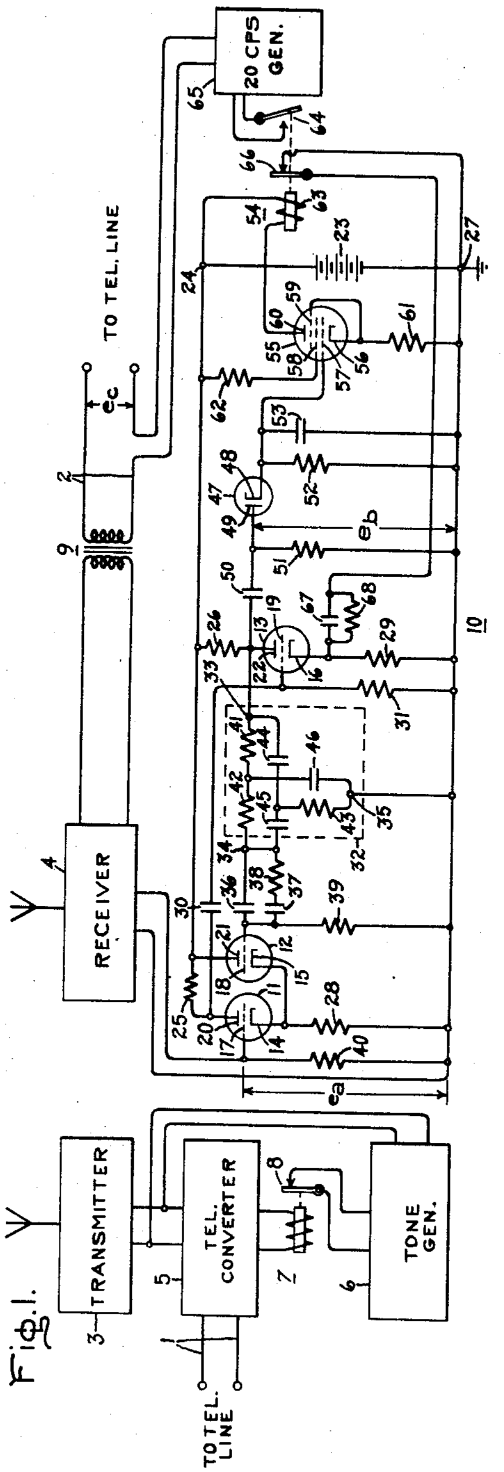

The present invention relates to transmission systems and has an object thereof to provide in a telephone system including wire lines, a radio link which will pass switching impulses associated with dial calling of one station by another station in the system.

Dial calling is performed by interrupting at a slow rate in a prescribed manner, low frequency audio waves which are then transmitted in the telephone system to perform their desired calling function. In places in the telephone system it is advantageous to have a radio link because of the impracticability of setting up and maintaining wire lines, as for example over water and over impenetrable terrain. However, conventional transmitters and receivers which would be used in this link will not pass low frequency dialing waves. Accordingly, applicant's invention is directed to a remedy of this situation.

In carrying the invention into effect, pulses of dialing waves of low frequency are converted into pulses of waves of a predetermined audio frequency higher in frequency than said low frequency, preferably though not necessarily, lying outside the audio band of frequencies used for the transmission of intelligence, and are applied to the transmitter prior to the intelligence signals desired to be transmitted. At the receiver the detected audio waves of predetermined frequency are selectively passed by a dialing channel while other audio waves are blocked from this dialing channel. The pulsations of these audio waves are utilized to cause corresponding pulsations in a low frequency generator supplying the line at the receiver end with dialing waves of low frequency.

The selective means utilized at the receiver to pass the audio waves of predetermined frequency must be of high selectivity in order to reject waves of other frequencies which would otherwise actuate the dialing circuits associated with the telephone line. When such selective means of high selectivity are utilized, an inherent delay, due to the high Q or ratio of stored energy to dissipated energy per radian of the wave applied to the selective means, is experienced in the build-up and decay of pulses of waves at the output thereof, with the result that the duration and separation of the dialing pulses are seriously distorted.

Accordingly, another object of the present invention is to provide a wave selective means in which the build-up and decay time therein of waves applied thereto are minimized without impairing the effective selectivity of the wave selective means.

In further carrying the invention into effect, means are provided to reduce the selectivity of the selective means when waves applied thereto build-up at the output thereof to a predetermined value and to increase the selectivity of said filter to its original value when said waves decay below a second predetermined value.

A further object of the present invention is to provide a highly selective filter arrangement which is able to respond to rapid alterations in the amplitudes and durations of waves applied thereto.

Figures 2A, 2B, 2C:
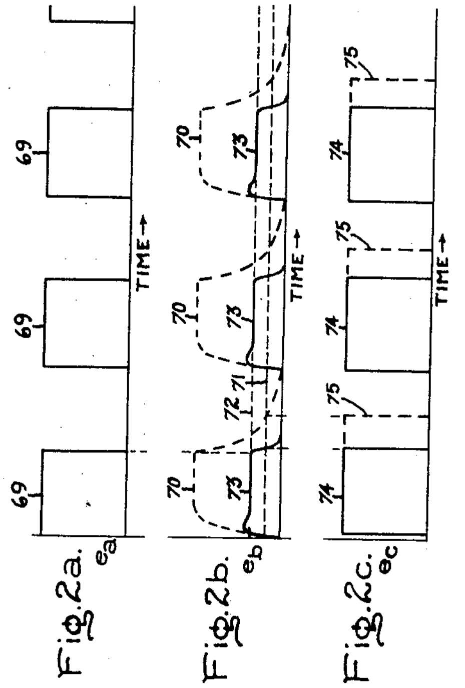

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which:

Fig. 1 is a block diagram partly in schematic form of an arrangement for carrying out my invention; and Figs. 2*a*, 2*b* and 2*c* show diagrams of the envelopes of the low frequency audio waves appearing at various points in the system and useful in explaining the operation of my invention.

Referring now to Fig. 1 of the drawing, there is shown a telephone system including a pair of telephone lines 1 and 2, the respective ends of which are connected to a transmitter 3 and receiver 4 to provide a link therebetween. Over the telephone line are passed audio waves and pulses of very low frequency audio waves which are used for dial switching in the telephone system. The modulating circuits of the transmitter 3 will not pass these low frequency dialing waves. Accordingly, an arrangement including a telephone converter 5 and a tone generator 6 is provided between the telephone line 1 and transmitter 3 to overcome this problem. The telephone converter 5 functions to separate the dialing waves from the audio intelligence waves and may comprise a relay 7 responsive only to the pulses of dialing waves. The tone generator 6 generates audio waves of a frequency which the transmitter 3 and receiver 4 will pass in response to actuation of the relay 7, a pair of contacts 8 of which are connected thereto. The output of the tone generator 6, which for example may have a frequency of about 3 kilocycles, is applied to the transmitter 3 along with the audio waves from the telephone line 1.

Accordingly, it is seen that in place of the low frequency dialing pulses, pulses of a higher audio frequency are obtained and are applied along with the audio waves to modulate the carrier wave of the transmitter.

The modulated waves from the transmitter 3 are detected by the receiver 4 and at the output of the receiver are obtained audio waves and pulses of audio waves having relatively high frequency. The output of the receiver 4 is connected through transformer 9 to the telephone line and thus the audio waves are passed to the telephone line. The dial switching waves are separated from the audio waves and are utilized to reconvert the high frequency dialing wave to low frequency dialing waves. This function must be performed in a manner free of interference from other audio waves. To this end a circuit arrangement 10 is provided, which passes waves of the desired frequency and rejects other audio waves. To perform these functions and to assure an appreciable excess of selected waves over undesired waves for reliable operation of the system the circuit arrangement must be highly selective. When a filter arrangement such as is to be described below is provided which is highly selective, inherently a delay is experienced in the build-up of waves to the output of the network and also a delay is experienced when the applied waves ceased. This is due to the high Q or ratio of stored energy in the network to the dissipated energy in the network per radian of the wave applied thereto associated with high selectivity circuits. The arrangement shown in schematic form in Fig. 1 is particularly directed to overcoming these disadvantages in a highly selective filter.

This arrangement comprises a selective amplifier which includes electron discharge devices 11, 12 and 13 including respective cathodes 14, 15 and 16, respective grids 17, 18 and 19, respective anodes 20, 21 and 22. These devices are supplied with unidirectional operating potential from source 23 having a positive terminal 24 connected to the anode 21 directly and to the anodes 20 and 22 through resistances 25 and 26, respectively and having a grounded negative terminal 27 connected to cathodes 14 and 15 through resistance 28 and to cathode 16 through resistance 29. Electron discharge devices 11 and 12 function as an amplifier. Waves appearing across the resistance 25 are applied to electron discharge device amplifier 13 through a coupling capacitor 30 connected between anode 17 and grid 19. Grid leak resistance 31 is connected between grid 19 and ground. The output from amplifier 13 is applied in degenerative phase to amplifier 11, 12 through filter network 32 having an input terminal 33, an output terminal 34 and a common terminal 35. The anode 22 of electron discharge device amplifier 13 is connected to input terminal 33. Common input and output terminal 35 is connected to ground. The output terminal 34 of network 32 is connected through capacitor 36 shunted by series combination of capacitor 37 and resistance 38 to grid 18 of electron discharge device 12. Grid 18 is connected to ground through grid leak resistance 39 and grid 17 is connected to ground through grid leak resistance 40.

The network 32 comprises resistances 41, 42 and 43, and capacitances 44, 45 and 46. The resistances 41 and 42 are connected in series between the input and output terminals 33 and 34, respectively and capacitor 46 is connected between the junction of these resistances and the common terminal 35. Capacitors 44 and 45 are connected in series between the input terminal and output terminals 33 and 34, respectively. The junction of these capacitances is connected to ground through resistance 43. When the resistances and capacitances of the network are proportioned so that:

Resistance 41=resistance 42,
Capacitance 44=capacitance 45,
Capacitance 46=two times capacitance 44,
Resistance 43=one-half of resistance 41, the transmission characteristic of the network 32 is such that at the center frequency determined by the relationship:

$$\text{Center frequency}=\frac{1}{2\pi\times\text{resistance } 41\times\text{capacitance } 44}$$

voltage waves applied between the input terminals 33 and 35 are not transmitted to the output terminals 34 and 35. However, at frequencies on either side of the center frequency, the transmission of waves increases with increase in departure from the center frequency. Thus, the feedback through network 32 from amplifier 13 to amplifier 11, 12 is zero at the center frequency of the network and is degenerative at frequencies both above and below the center frequency. Accordingly, the discharge devices 11, 12 and 13 amplify the center frequency considerably more than frequencies on either side of the center frequency and thus the amplifiers selectively passes the frequency to which the network 32 is tuned.

The network comprising capacitors 36 and 37 and resistance 38 is known as an anti-thumping network and functions to prevent self-oscillation of the amplifier at frequencies below the frequency of operation of the selective amplifier and particularly the frequencies of the order of a few, as for example, 3 cycles per second.

The output appearing across anode load resistance 26 is rectified by unilaterally conducting device 47 comprising a cathode 48 and an anode 49. The anode 49 is connected through coupling capacitor 50 to anode 22 and through resistance 51 to ground. The cathode 48 is connected to ground through resistance 52 shunted by filter capacitor 53. The rectified output appearing across resistance 52 is utilized to energize relay 54. To this end is provided an electron discharge device 55 having a cathode 56, a control grid 57, a screen grid 58, a suppressor grid 59 and an anode 60. The cathode 56 is connected to ground through resistance 61 to negative terminal 27 of the source of unidirectional potential 23.

The grid 57 is connected to the cathode 48. The screen grid 58 is connected to the positive terminal of the unidirectional source through resistance 62. The suppressor grid 59 is connected to the cathode 56 and the anode 60 is connected through the coil 63 of relay 54 to the positive terminal 24 of the source of unidirectional potential 23. The relay 54 is provided with a pair of normally open contacts 64 which are connected to a source 65 of low frequency audio waves, the output of which is connected to the telephone line 2.

When these contacts 64 are closed, low frequency audio waves are supplied to the telephone line 2. Relay 54 is also provided with a pair of normally closed contacts 66 which connect a capacitance 67 shunted by resistance 68 in shunt with cathode resistance 29 of device 13. The operation of this arrangement will be explained in greater particularity in connection with the diagrams of Fig. 2.

Referring now to Figs. 2*a*, 2*b* and 2*c*, there are shown graphs of the envelopes of the dial switching wave at points in circuit of Fig. 1 having a corresponding literal designation. In each of these graphs the abscissa represents time and the ordinate represents amplitude. In Fig. 2*a* is shown the graph of the dial switching wave appearing at the output of the receiver 4. In Fig. 2*b* is shown a dotted graph 70 of the manner in which the output of the selective network 10 across the load resistance 26 builds up to a peak value and then decays after the waves applied to the filter cease when the circuit comprising contact 66 is not energized. Line 72 running parallel to the abscissa represents the amplitude of audio signal at which the relay 54 is actuated and line 71 running parallel to the abscissa represents the amplitude of the wave appearing at the anode 22 of the device at which the relay 54 is deenergized. The dotted graph 70 in Fig. 2*b* represents the envelope of waves appearing across the anode load 26 when the normally closed pair of contacts 66 of relay 54 are in circuit as shown in accordance with the present invention. In Fig. 2*c* are shown graphs 74 of the manner in which the relay 54 is actuated. The solid pulses represent time during which the relay is actuated when the arrangement in accordance with the present invention is utilized. The dotted extensions 75 in the solid portions represent the additional time during which relay 54 is actuated when the arrangement in accordance with the present invention is not utilized.

In operation, pulse of low frequency audio waves, the envelopes of which are shown in Fig. 2*a* and appear at the output of the receiver are applied to the selective amplifier 10. Capacitor 67 is in shunt with the cathode resistance and the amplifier 13 has high gain and the selective amplifier 10 has high selectivity. Accordingly, the waves appearing at the output of the amplifier 13 gradually build-up to a certain value as shown in the dotted graph 70 of Fig. 2*b*. When the voltage appearing across resistance 26 attains a value represented by the ordinate 72, the relay 54 is actuated opening the contact 66 and disconnecting capacitance 67 and resistance 68 from the circuit. By this operation the amplifier 13 becomes degenerative and the waves at the output thereof do not build-up appreciably higher than this magnitude 72 and continue at this value for the duration of the pulse. Upon cessation of waves applied to the selective amplifier 10, the output across resistance 26 decays, as shown, rapidly to a value corresponding to the ordinate 71 and relay 54 is deactuated as desired. The dotted graph 70 shows the manner in which the voltage across resistance 26 would build-up and then decay were not the arrangement of applicant's invention used. An excess value of voltage is normally applied to the relay tube 55 and relay 54 in order to insure operation in periods of low operating voltage, variation of receiver output, etc.

In the present arrangement, since the waves in the selective network do not build-up to as high a value, they decay much more rapidly by reason of the degeneration produced, the deactuation of relay 54 occurs earlier and in close correspondence with the cessations of the applied low frequency wave. The relay is, thus, caused to follow the pulses of audio waves even though the highly selective amplifier 10 is employed. In Fig. 2*c* the solid pulses represent the time during which relay 54 is operative in response to the pulses of audio waves and the dotted extensions thereof represent the additional time that relay would be on were not applicant's invention utilized. It is to be noted that the occurrence and duration of pulses are in very close correspondence to the occurrence and durations of pulses respectively appearing at receiver 4. It is to be further noted that alteration of the selectivity of amplifiers is effected without altering the unidirectional voltage conditions existing in the selective amplifier. Proportioning of resistors 68 and 29 is effected together with capacitor 67 to enable equalizing of the delay time at the beginning and at the end of each dial impulse.

While I have shown a particular embodiment of my invention, it will of course be understood that I do not wish to be limited thereto since many modifications, both in the circuit arrangement and in the instrumentalities employed, may be made, and I therefore contemplate by the appended claims to cover any such modifications as fall within the true spirit and scope of my invention.

What I claim as new and desire to secure by Letters Patent of the United States is:

1. The combination, in a transmission system of high selectivity and fast response for passing pulses of waves having a predetermined frequency, of means including an amplifier having a feedback path from the output to the input thereof in which is connected a network having reactance elements which transmits in degenerative phase waves from the output to the input thereof at all except a narrow band of frequencies, whereby said amplifier selectively passes said waves and rejects other waves, means responsive to waves passed by said amplifier when said waves attain a predetermined amplitude relatively small in magnitude in comparison to the amplitude which said waves may attain for lowering the gain of said amplifier thereby lowering the selectivity of said selective means, whereby when said pulses of waves cease waves at the output of said first means decay rapidly, said last mentioned means being responsive to waves below another predetermined amplitude smaller in magnitude than said first predetermined amplitude for returning the original gain to said amplifier and said selectivity to said selective means, whereby the duration and occurrence of waves in the interval between the time of occurrence of said predetermined amplitudes substantially corresponds to the duration and occurrence of said pulses of waves.

2. The combination, in a transmission system of high selectivity and fast response for passing pulses of waves having a predetermined frequency, of selective means for passing only waves of said predetermined frequency, said means including an amplifier, the amplification of which determines the selectivity of said selective means, the electron discharge path of said amplifier including a biasing resistance, said amplifier having low amplification for said predetermined frequency when said resistance is unby-passed for said predetermined frequency, means for by-passing said resistance for said frequencies, means responsive to waves passed by said selective means when said waves attain a predetermined amplitude for unbypassing said resistance thereby lowering the selectivity of said selective means, whereby when said pulses of waves cease waves at the output of said selective means decay rapidly, said last mentioned means being responsive to waves below another predetermined amplitude lower than said first predetermined amplitude for returning said bypass across said resistance, thereby restoring the original selectivity to said selective means.

3. The combination, in a transmission system of high selectivity for passing pulses of waves having a predetermined frequency, of a device to be actuated, filter means including an amplifier comprising an electron discharge device and resistance and reactance elements so connected and proportioned to provide a highly selective filter the selectivity of which is determined by the amplification of said amplifier to pass only waves of said predetermined frequency, the electron discharge path of said amplifier including a biasing resistance for providing high gain to said amplifier, pulses of waves applied to the input of said means building up gradually and decaying gradually at the output thereof due to the high selectivity of said filter means, means responsive to waves passed by said selective means for actuating said device when said waves attain a predetermined amplitude, means responsive to the actuation of said device for unbypassing said resistance to reduce the amplification of said amplifier and the selectivity of said selective means during the occurrence of said pulses of waves and the rate at which waves at the output of said first means decay when said pulses of waves cease, means responsive to said waves for deactuating said device when said waves decay to another predetermined amplitude, means responsive to the deactuation of said device for by-passing said resistance to waves of said predetermined frequency to restore the original selectivity to said selective means, whereby said selective means is of relatively low selectivity substantially during the occurrence of said waves and a short time thereafter dependent on the time required for said waves to decay to said other predetermined value and is of high selectivity at other times, and whereby only those pulses of waves of said predetermined frequency actuate said device and only during a time substantially correspondent to the time of occurrence of said pulses of waves.

4. The combination, in a transmission system of high selectivity for passing pulses of waves having a predetermined frequency, of a device to be actuated, filter means including an amplifier comprising an electron discharge device and resistance and reactance elements so connected and proportioned to provide a highly selective filter the selectivity of which is determined by the amplification of said amplifier to pass only waves of said predetermined frequency, the electron discharge path of said amplifier including a biasing resistance shunted by a parallel combination of a capacitance and a resistance relatively high with respect to said biasing resistance, said parallel combination having low impedance for waves of said predetermined frequency thereby providing high gain for said amplifier, pulses of waves applied thereto, building up at the output of said means gradually and decaying gradually due to the high selectivity of said filter means, means responsive to waves passed by said selective means for actuating said device when said waves attain a predetermined amplitude, means responsive to the actuation of said device for disconnecting said parallel combination from said discharge path to reduce the amplification of said amplifier and the selectivity of said selective means during the occurrence of said pulses of waves and the rate at which waves at the output of said first means decay when said pulses of waves cease, means responsive to said waves for deactuating said device when said waves decay to another predetermined amplitude, means responsive to the deactuation of said device for reconnecting said parallel combination in shunt with said resistance to restore the original selectivity to said selective means, whereby said selective means is of relatively low selectivity substantially during the occurrence of said waves and a short time thereafter dependent on the time required for said waves to decay to said other predetermined value and is of high selectivity at other times, and whereby only those pulses of waves of said predetermined frequency actuate said device and only during a time substantially correspondent to the time of occurrence of said pulses of waves.

5. In a circuit of high selectivity operating on a frequency in a range of frequencies above the audio range and wherein said circuit includes a degenerative feedback circuit including filter means to suppress output from said circuit except for pulses of substantially one frequency of said range of frequencies, means to provide circuit output pulses to faithfully follow input waves to said circuit in time duration comprising relay means responsive to said input waves and means responsive to said relay means to temporarily lower the selectivity of said circuit until said input waves have insufficient energy to keep said relay activated to thereby cause faithful following of time duration of said pulses by delaying at the trailing edge of said waves an amount of time approximately equal to the delay time at the beginning of said waves before the highly selective circuit builds up a signal sufficient to trigger off said relay means to actuate said means to lower selectivity.

6. In combination, a circuit on which may be impressed oscillations of a wide range of frequencies and pulses of oscillations having a predetermined frequency within said range, a relay having an armature operable between two positions, means selectively to operate said armature to one position in response to initiation of each of said pulses and to the other position in response to, and substantially simultaneous with, termination of said pulses without interference by oscillations of frequency in said range other than said predetermined frequency, said means comprising a frequency selective amplifier having its input connected to said circuit and its output connected to said relay, said selective amplifier having such high selectivity to the frequency of the oscillations comprising said pulses as to produce in its output circuit pulses of greater magnitude than is required to operate the relay, and such that undesired delay may occur on termination of said oscillations at the output of said circuit after termination of pulses in said first circuit due to storage action of said selective amplifier, and means to avoid said delay in the operation of said relay, said last means comprising means responsive to operation of the relay in response to initiation of a pulse to reduce the amplification of said amplifier during the pulse to a value such that the pulse supplied to said relay has a value approximating that required to maintain the relay in desired position during the pulse, whereby upon termination of said pulse in said first circuit the relay returns to its initial position without delay caused by said storage action.

7. In combination, an input circuit on which may be impressed oscillations having a wide range of frequencies, and pulses of oscillations having a predetermined frequency in said range, an output circuit, means to select said pulses from the oscillations in said input circuit and to supply them to said output circuit without substantial delays in initiation and termination due to build up and decay periods in said selective means, said selective means comprising an amplifier connected between said input and output circuits having a degenerative feed back path including a second amplifier, said degenerative feed back path sharply attenuating said predetermined frequency but passing all other frequencies in said range, whereby said amplifier is degenerative at all frequencies except said predetermined frequency and initiation of pulses of oscillations of said predetermined frequency in the input is followed by rapid initial build up of pulses in said output having reducing rapidity of build up with time in each pulse, means responsive to initiation of pulses in the output in the early stages of build up to render said second amplifier degenerative thereby to reduce the gain of said first amplifier to prevent further build up of oscillations in said selective means whereby upon termination of said pulses in said input said reproduced pulses at the output rapidly decay, and said reproduced pulses in said output occur substantially coincident in time with said pluses in said input circuit both as to initiation and termination.

8. In a calling apparatus for telephone systems, the combination of an input circuit on which may appear audio oscillations representing voice signals to be transmitted and calling pulses of oscillations having a frequency in the frequency range of said audio oscillations, a signal device, means to operate said signal device in response to and substantially simultaneously with initiation of each of said pulses in said input circuit and to terminate its operation in response to and substantially simultaneously with termination of each pulse in said input circuit, said last means comprising a selective amplifier connected between said input circuit and said signal device, said amplifier being highly degenerative at all frequencies in said range except the frequency of oscillations comprising said pulses and having sufficient amplification to produce operation of said signal device in response to an early stage of build up of each pulse in said selective amplifier, means responsive to the output of said amplifier upon operation of said signal device to reduce the amplification of said amplifier during each pulse to a level just above that required to maintain said signal device in operative condition during the pulse whereby upon termination of said pulse operation of said signal device terminates in the early stage of decay of oscillations at the output of said amplifier.

References Cited in the file of this patent

UNITED STATES PATENTS

| | | |
|---|---|---|
| 1,688,453 | Demarest | Oct. 23, 1928 |
| 1,863,895 | Bishop | June 21, 1932 |
| 2,088,229 | Braden | July 27, 1937 |
| 2,156,702 | Place | May 2, 1939 |
| 2,208,665 | Crabtree | July 23, 1940 |
| 2,283,241 | Van Cott | May 19, 1941 |
| 2,414,795 | Brandt | Jan. 28, 1947 |
| 2,469,555 | Hitchcock | May 10, 1949 |
| 2,495,511 | Dolberg | Jan. 24, 1950 |
| 2,702,839 | Hogue | Feb. 12, 1955 |